United States Patent [19]

Gross

[11] Patent Number: 5,190,675
[45] Date of Patent: Mar. 2, 1993

[54] GELLING ORGANIC LIQUIDS

[75] Inventor: J. Mark Gross, Broken Arrow, Okla.

[73] Assignee: Dowell Schlumberger Incorporated, Tulsa, Okla.

[21] Appl. No.: 464,640

[22] Filed: Jan. 5, 1990

Related U.S. Application Data

[63] Continuation of Ser. No. 808,133, Dec. 12, 1985, abandoned.

[51] Int. Cl.$^5$ .......................... E21B 43/26; B01J 13/00
[52] U.S. Cl. .............................. 252/8.551; 252/315.1; 44/268
[58] Field of Search .......................... 252/8.551, 315.1; 44/7.6; 556/14

[56] References Cited

U.S. PATENT DOCUMENTS

| | | | |
|---|---|---|---|
| 3,575,859 | 4/1971 | Monroe | 252/32.5 |
| 3,757,864 | 9/1973 | Crawford et al. | 252/8.551 X |
| 4,104,173 | 8/1978 | Gay et al. | 252/8.551 |
| 4,153,649 | 5/1979 | Griffin | 252/8.551 X |
| 4,174,283 | 11/1979 | Griffin | 252/8.551 |
| 4,200,540 | 4/1980 | Burnham | 252/8.551 |
| 4,316,810 | 2/1982 | Burnham | 252/8.551 |
| 4,537,700 | 8/1985 | Purinton | 252/315.1 |
| 4,877,894 | 10/1989 | Huddleston | 252/8.551 X |

Primary Examiner—Richard D. Lovering
Assistant Examiner—Gary L. Geist
Attorney, Agent, or Firm—Stephen A. Littlefield

[57] ABSTRACT

A method of producing a gel of an organic liquid, using a metal phosphate ester in which all of the reagents are substantially free of water and pH-affecting substances. The gel is particularly useful in fracturing subterranean formations by entraining a solid particulate proppant therein and pumping the resultant mixture into the subterranean rock formation at sufficient pressure to fracture the formation. The organic liquid is preferably a hydrocarbon such as diesel or crude oil, and the metal phosphate ester is preferably an aluminum phosphate diester. The metal phosphate diester may be prepared by the reaction of a triester with $P_2O_5$ to produce a polyphosphate, which is then reacted with an alcohol to produce a phosphate diester. The latter diester is then added to the organic liquid along with a non-aqueous source of aluminum, such as aluminum isopropoxide in diesel, to produce the metal phosphate diester. The conditions in the foregoing two reaction steps are controlled to provide a gel with good viscosity versus temperature and time characteristics.

27 Claims, 8 Drawing Sheets

GELLING ORGANIC LIQUIDS

This application is a continuation of application Ser. No. 06/808,133, filed Dec. 12, 1985, now abandoned.

FIELD OF THE INVENTION

This invention relates to a method for preparing organic liquid gels, in particular gels of liquids which are primarily hydrocarbons. The gels are useful in fracturing subterranean formations.

DESCRIPTION OF RELEVANT ART

A technique for increasing the production of hydrocarbons from hydrocarbon bearing formations, consists of fracturing a subterranean formation into which the well is drilled, by means of pumping a fluid down the well into the formation, at sufficient flow rate and pressure so as to fracture the formation. A hard particulate proppant is often added to at least a portion of the fluid prior to pumping the fluid down the well. The proppant is thus carried into the resultant fracture, deposited, and holds the fracture open. In order to have the fluid efficiently carry the proppant, it is desirable to utilize a viscous fluid in the form of a gel. After the gel and proppant have been pumped into the fracture, the viscosity of the gel is reduced, thereby depositing the proppant within the fracture and allowing the fracturing fluids and formation fluids to return to the wellbore.

The viscosity of the fracturing fluid is important. The viscosity must be high enough to suspend and carry the proppant, but low enough to be readily pumpable. The gel used for fracturing should have a viscosity such that the hard particulate proppant does not prematurely settle out from the gel. If the gel is overly viscous, it will be difficult to pump down the well with conventional pumping equipment. A further requirement of the gel is that it maintains its viscosity at the higher temperatures often encountered in hydrocarbon bearing formations. Loss of such viscosity at higher temperatures may result in premature proppant deposition.

Historically, the art of gelling organic liquids (typically hydrocarbons) for oil field fracturing purposes has involved introducing a phosphate ester and an aluminum source into the organic liquid. The in situ reaction between the phosphate ester and the aluminum source formed an aluminum phosphate ester which, in turn, gelled the hydrocarbon.

The first phosphate esters were made by reacting a mixture of alcohols (such as ethyl, octyl, and decyl alcohols) with $P_2O_5$. The resulting product was a mixture of the corresponding mono- and di-phosphate esters. These and similar phosphate esters were termed "gelling agent" by the oil field industry.

When the foregoing ethyl-octyl-decyl phosphate ester mixture was added to an organic liquid, along with an aluminum salt (typically, in the form of an aqueous sodium aluminate solution, acting as an "activator"), the corresponding aluminum phosphate ester was formed, thereby gelling the organic liquid. Gels produced by such a method tended to break and lose viscosity at temperatures much above 200° F.

Another method of making phosphate esters for this purpose involved reacting substantially equimolar amounts of triethyl phosphate and $P_2O_5$ at about 70° C., to produce a polyphosphate reaction intermediate. Such intermediate was then reacted at about 90° C. with an equimolar amount of an alcohol (a commercial mixture of $C_8$ and $C_{10}$ alkanols), to produce a phosphate ester with its product skewed to be nearly all diester; statistically, one radical of the diester was an ethyl radical from the triethyl phosphate and the other radical was provided by the added alcohol. When this phosphate ester mixture was introduced to an organic liquid, and then reacted in situ with an aqueous sodium aluminate activator, the resulting gel gave improved viscosity/temperature characteristics over the gel prepared using the phosphate ester gelling agent as described in the first method. This improved performance was apparently due to lower concentration of monoesters in the newer gelling agent. However, the gel prepared by this second method rapidly loses viscosity at temperatures much above 230° F., such viscosity loss becomes even more severe with time at such elevated temperatures. It should be noted that the gels prepared by both of the two foregoing methods again typically had water and pH affecting salts (in particular NaOH) in them, due to the use of the aqueous sodium aluminate solution as the activator.

Methods of preparing gels similar to the methods above, have been suggested but with reactants which provide phosphate diesters with aliphatic groups, one of them being a $C_1$ to $C_{26}$ aliphatic radical, and the other being a $C_6$ to $C_{26}$ aliphatic radical. In addition, the possibility of preparing gels by methods similar to the above, has also been suggested using other metal salts in place of the aluminum salt, for example, salts of gallium, lanthanum, erbium, thorium, or strontium.

SUMMARY OF THE INVENTION

The present invention provides a method for preparing a gel particularly useful in fracturing subterranean formations, and a method for fracturing such formations utilizing such a gel. The gel comprises a gellable organic liquid, a phosphate diester gelling agent and an activator. The organic liquid, is typically a hydrocarbon such as crude oil, diesel oil, kerosene, or other refined hydrocarbon. The gel is prepared by adding or making in situ, a metal salt of a phosphate diester. Preferably, the statistical distribution of the organic radicals on each phosphate diester is: one being a $C_1$ to $C_{26}$ aliphatic radical, while the other is a $C_6$ to $C_{26}$ aliphatic radical. Most preferably, one such radical is a $C_8$ to $C_{20}$ alkyl radical.

The preferred method of preparing the phosphate ester is: First, reacting a phosphate triester with $P_2O_5$ to produce a corresponding anhydrous polyphosphate reaction intermediate. Second, reacting the polyphosphate with an alcohol to produce the corresponding diester, statistically having one radical from the triester and another radical from the alcohol.

The preferred method of preparing a gel is: First, the foregoing diester is added to a gellable organic liquid. Second, a metal salt activator with a non-pH affecting residue, such as a metal alkoxide and preferably aluminum isopropoxide, is also added to the organic liquid so that the metal salt reacts with the phosphate diester to produce the corresponding metal phosphate diester thereby gelling the organic liquid.

The viscosity response of the gels at different temperatures can be controlled by varying the chemical composition of the phosphate diester as well as varying the phosphate ester to activator ratio. Changes in the chemical composition of the phosphate diester can be accomplished by altering the mole ratios of the trialkyl phosphate ester and the $P_2O_5$ used in the first step of the reaction sequence, as well as the mole ratios of the alcohol and the polyphosphate reaction intermediate used in the second step of the reaction sequence. Fluids with excellent high temperature stability are produced for example, by using from about 20% to about 40%, (and preferably a 30% to 40%) mole excess of triethyl phosphate in the preparation of the polyphosphate. In addition, 20% mole excess of the alcohol is preferably utilized in producing the phosphate diester. By "mole excess" is meant the excess number of moles above the stoichiometrically desired amount. Typically, the polyphosphate intermediate is allowed to react with the alcohol for a period of at least one hour, while the temperature is maintained at least substantially at 130° C.

Gels produced by the above methods can be used in fracturing a subterranean formation which is penetrated by a wellbore. Using conventional pumping procedures, a hard particulate proppant is usually entrained in the gel by known blending techniques, and the slurry (gel and proppant) is then pumped down the well into the subterranean formation, at sufficient flow rates and pressure so as to create and/or extend a fracture into the formation. Other conventional additives (e.g., breakers) used with oil-base fracturing fluids can also be used in the fracturing fluids of the present invention.

DRAWINGS

Embodiments of the invention will now be described with reference to the drawings in which.

DETAILED DESCRIPTION OF EMBODIMENTS OF THE INVENTION

The viscosity of a suitable hydrocarbon can be raised by the addition of, a phosphate diester followed by the in situ reaction of the phosphate diester with selected metallic salts. The rheology, i.e., the viscosity profile as a function of time and temperature under shear conditions, of such a gelled hydrocarbon, is affected by the presence or absence of any significant amounts of water and/or pH-affecting substances. The rheology of the gel is also affected by the choice of the phosphate diester used to prepare the gel.

The present method of preparing a desirable phosphate diester is accomplished by reacting a phosphate triester with $P_2O_5$ to produce a polyphosphate reaction intermediate. The polyphosphate is then reacted with an alcohol to produce a phosphate diester gelling agent.

The use of a non-aqueous aluminum salt (e.g., aluminum alkoxides) in the preparation of the gel helps eliminate introduction of water and/or pH-affecting substances. For example, aluminum isopropoxide in a solution of an organic solvent can be used as the activator for reacting with the phosphate diester. The in situ reaction between the aluminum and the phosphate diester causes the organic liquid to gel. Using this method, hydrocarbon gels were prepared as specified in the following examples. Viscosity measurements were made on each of the gels to aid in determining their utility as a fracturing fluid using a Model 50C Fann Viscometer. The rheology of the fluids was determined under a variety of shear rate conditions and temperature conditions. The viscosity of the hydrocarbon gels was also measured using a Marsh Funnel viscometer. The advantage of using a Marsh Funnel is that its physical size and durability allow for it to be used under a variety of field conditions. For those familiar with these types of viscometers, it is readily apparent that the shear rate conditions and the temperature conditions encountered when using a Marsh Funnel probably do not simulate the downhole fracturing environment. However, the data obtained from the Marsh Funnel tests on the present fluids proved to be remarkably good in identifying suitable fracture fluids.

EXAMPLE 1

Triethyl phosphate and a solvent of aromatic hydrocarbons are mixed together in a reactor and preheated to 110° F. (43° C.) $P_2O_5$ is added to form a reaction intermediate, keeping the temperature below 195° F. (90° C.) On addition of all the $P_2O_5$, the temperature is maintained at 210° F. (100° C.) for 1 hour. Following this, ALFOL 810 (a commercial mixture of $C_8$ and $C_{10}$ alkanols) is added to the reaction intermediate and the mixture cooked at 265° F. (130° C.) for 2 hours.

| Chemical Ratios Used: | |
| --- | --- |
| $P_2O_5$ | 1 mole |
| Triethyl phosphate | 1.3 mole; 30% mole excess |
| ALFOL 810 | 3.9 mole; 30% mole excess |
| Aromatic hydrocarbon solvent | 20% by weight of final product |

Figure 1:
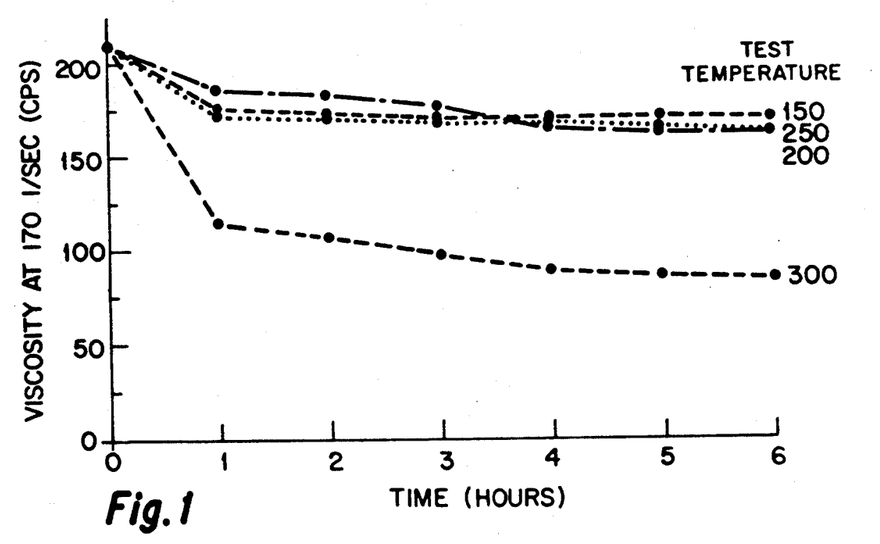
FIG. 1 illustrates viscosity vs. time profiles of a gel prepared by the method of the present invention at various temperatures.

The gelling agent resulting from the above was used to gel diesel oil by addition thereto along with aluminum isopropoxide. The viscosity vs. time profiles of the resultingggel at various temperatures are shown in FIG. 1. As will be seen from FIG. 1, the foregoing gel exhibits good viscosity characteristics even up to 300° F.

EXAMPLE 2

In a comparative experiment, triethyl phosphate and a solvent of aromatic hydrocarbons are mixed together in a reactor and preheated to 100° F. (43° C). $P_2O_5$ is added, reacting with the triethyl phosphate to form a polyphosphate reaction intermediate. During the $P_2O_5$ addition the temperature is kept below 158° F. (70° C.), and then the temperature is subsequently maintained at 158° F. (70° C.) for one hour. Following this, ALFOL 810 is added to the reaction intermediate and the mixture is cooked at 195° F. (90° C.) for two hours.

| Chemical Ratios Used: | |
|---|---|
| P$_2$O$_5$ | 1 mole |
| Triethyl phosphate | 1.3 mole; 30% mole excess |
| ALFOL 810 | 3.1 mole; 3% mole excess |
| Aromatic hydrocarbon solvent | 20% by weight of final product |

Figure 2:
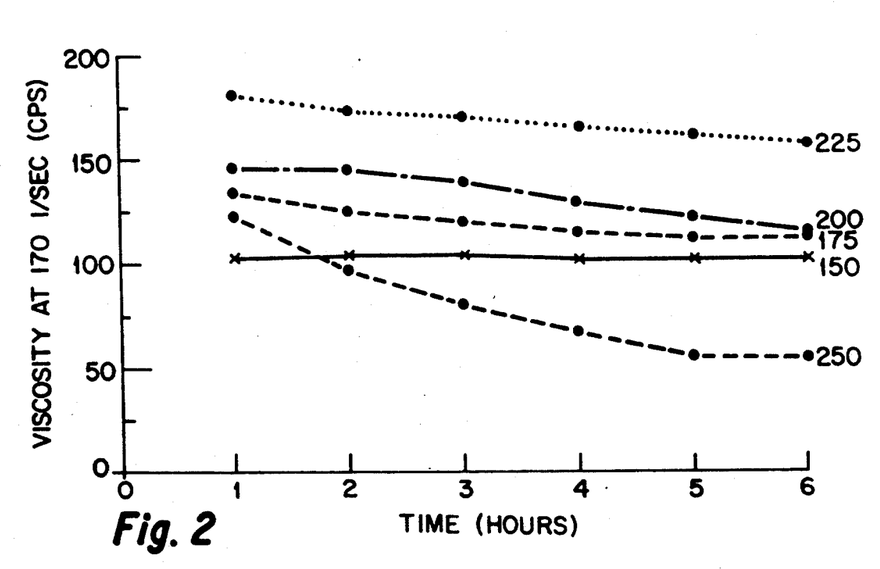
FIG. 2 is a graph similar to FIG. 1, but for a gel prepared by another method.

A hydrocarbon gel was prepared by adding to diesel oil, a commercially available aqueous solution of sodium aluminate (which has sodium hydroxide present as a stabilizing agent and the foregoing phosphate diester. The viscosity vs. time profile at several temperatures is shown in FIG. 2. The gel was also tested at 275° F. and it exhibited even poorer viscosity than at 250° F. A comparison of FIG. 2 with FIG. 1, illustrates the superior rheology of a gel prepared by the method of Example 1 (which is a method of the present invention) over the method of this Example (which is not a method of the present invention).

EXAMPLE 3

In another comparative experiment, ethanol and ALFOL 810 are mixed together in a reactor and preheated to 150° F. (65° C.), then P$_2$O$_5$ is added to the alcohols not letting the reaction temperature exceed 175° F. (79° C.) Upon addition of all the P$_2$O$_5$, the temperature is maintained at 212° F. (100° C.) for 90 minutes. This product contains substantially equimolar quantities of ethyl-octyl-decyl phosphate mono- and diesters.

| Chemical Ratios Used: | |
|---|---|
| P$_2$O$_5$ | 1 mole |
| Ethanol | 1.8 mole |
| ALFOL 810 | 1.8 mole |
| Aromatic hydrocarbon solvent | 20% by weight of final product |

Figure 3:
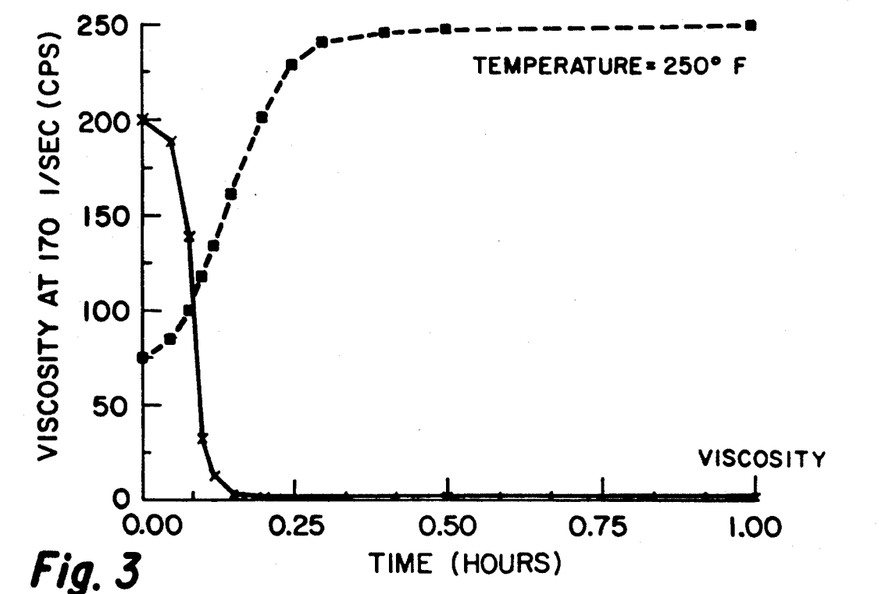
FIG. 3 illustrates a viscosity vs. temperature profile of a gel prepared by still another method.

The foregoing phosphate ester gelling agent is added to diesel oil in an amount equal to 8 gallons per 1000 gallons diesel. To this solution is added a solution of aluminum isopropoxide until the consistency of the gel exhibits a smooth honey-like character. The uniformity of this gel is not easy to achieve and even when the desired gel is reached, the viscosity degrades rapidly when it is subjected to elevated temperatures. In FIG. 3 the viscosity vs. time/temperature profile of such a gel is plotted at 250° F. As can be seen from FIG. 3, the resulting gel was useless as a fracturing fluid even at a temperature of about 140° F. because of its low viscosity. Thus, as here illustrated, it is not sufficient to react a non-aqueous source of aluminum (the aluminum isopropoxide in this case) with a phosphate ester which results from reacting a mixture of alcohols directly with P$_2$O$_5$. This is apparently a result of the substantial amounts of monoesters which are produced when a phosphate ester is prepared by the method of this example.

EXAMPLE 4

Two hydrocarbon gels were prepared for o comparison purposes. Gel #1 was made by introducing 8.0 mL of the phosphate ester gelling agent prepared by the procedure described in Example 2 into 1000 mL of diesel oil under agitation. To this was added 0.88 mL of a sodium aluminate activator solution and the mixture was allowed to continue to agitate for a period of two minutes. Gel #2 was made by agitating 1000 mL of diesel oil to which was added 8.0 mL of the phosphate ester gelling agent prepared by the procedure as described in Example 1, and 2.35 mL of an aluminum isopropoxide solution, all of which was allowed to mix for a period of two minutes. Viscosity measurements using the Marsh Funnel and the Model 50C Fann Viscometer were made, and are illustrated in Tables I and II.

TABLE I

| | MARSH FUNNEL TIMES[1] | |
|---|---|---|
| Time After Gel Formed (Hrs) | Gel Prepared Using Aqueous Sodium Aluminate | Gel Prepared Using Aluminum Isopropoxide |
| 0 | 7 | — |
| 1 | 60 | 144 |
| 2 | 85 | — |
| 3 | 120 | — |
| 4 | 150 | — |
| 5 | 180 | — |
| 6 | 210 | — |
| 24 | 650* | 125 |
| 48 | 780 | — |

[1]Time to drain the first 1000 mL from a Marsh Funnel that has been filled with fluid to the screen.
*It was found in different trials of gels made by the same method that this value was sometimes greater than 1000 secs which emphasizes the erratic results obtained by prior art gels.

TABLE II

| | VISCOSITY AT 250° C., 170 SEC −1 (cps)[2] | |
|---|---|---|
| Time at Temperature | Gel Prepared Using Aqueous Sodium Aluminate | Gel Prepared Using Aluminum Isopropoxide |
| 1 | 123 | 171 |
| 2 | 97 | 169 |
| 3 | 81 | 167 |
| 4 | 68 | 164 |
| 5 | 56 | 163 |
| 6 | 55 | 162 |

[2]Gel aged 16 hours before before being tested on the Fann 50C.

Note that the Marsh Funnel times of Gel #1, prepared using the aqueous sodium aluminate solution, continued to change over a period of time making it difficult to predict when the gel had achieved adequate viscosity for use as a fracturing fluid. This same gel, having been aged for sixteen hours, still gave inadequate viscosity when it was then exposed to 250° F. for more than 4-5 hours in a Fann 50C Viscometer. On the other hand, Gel #2, prepared using the aluminum isopropoxide, exhibited stable Marsh Funnel times even after 24 hours. Also, Gel #2 demonstrated adequate and stable viscosities when it was tested at 250° F. on the Fann 50C. Thus it can be seen from Table I that gels prepared using the method of the present invention (Example 4, Gel #2, in which aluminum isopropoxide was used), can be prepared in the lab and more importantly, at a well site, with the desired viscosity being readily ascertained (monitored) by a simple method such as using a Marsh Funnel which correlates to the results obtained from the more sophisticated Fann 50C Viscometer. On the other hand, gels which are prepared by a method not in accordance with the present invention (Example 4, Gel #1, in which aqueous sodium aluminate was used) may appear to have the desired viscosity as measured by the Marsh Funnel test, but in fact when exposed to elevated temperatures, will have viscosities which are far too low for a suitable fracturing fluid.

EXAMPLE 5

Figure 4:
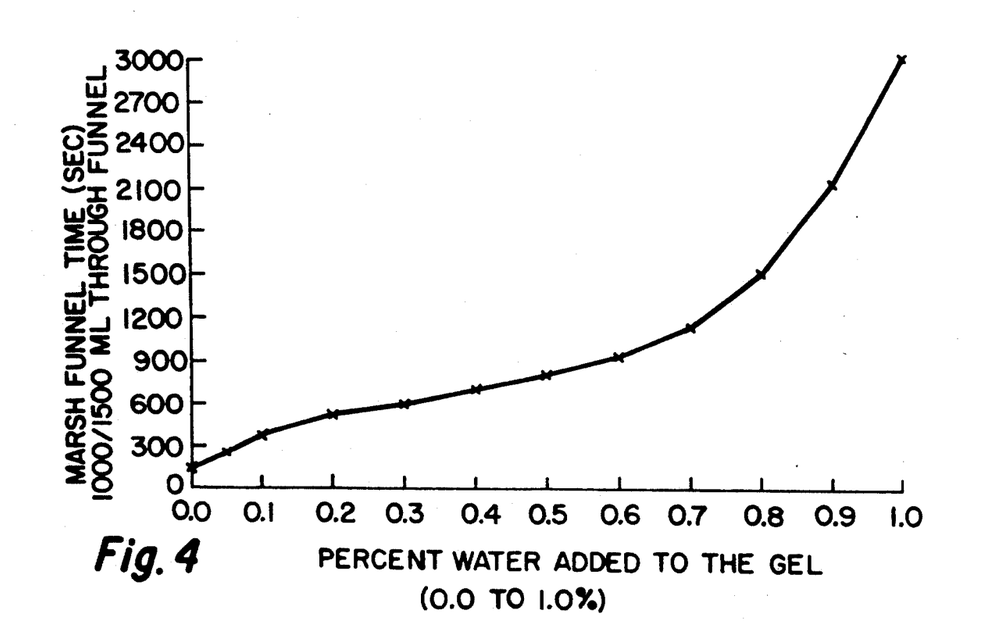
FIG. 4 illustrates Marsh Funnel times for a gel prepared by the method of the present invention, versus increased concentration of water present in the gel.

A hydrocarbon gel was prepared in accordance with the method of Example 1. Various percentages of water were added thereto with Marsh Funnel viscosity measurements being made on each sample. The resulting Marsh Funnel times being plotted as a function of the percent weight of water added are illustrated in FIG. 4. The Marsh Funnel times did not bear any discernible relationship to the viscosities of the same fluids when measured on the Fann 50C Viscometer at 170 sec$^{-1}$. Thus, FIG. 4 illustrates again, the importance of maintaining the reagents for making this gel anydrous or substantially free of water. Typically less than about 0.05 percent are present in fluids prepared according to the present invention.

EXAMPLE 6

Figure 6:
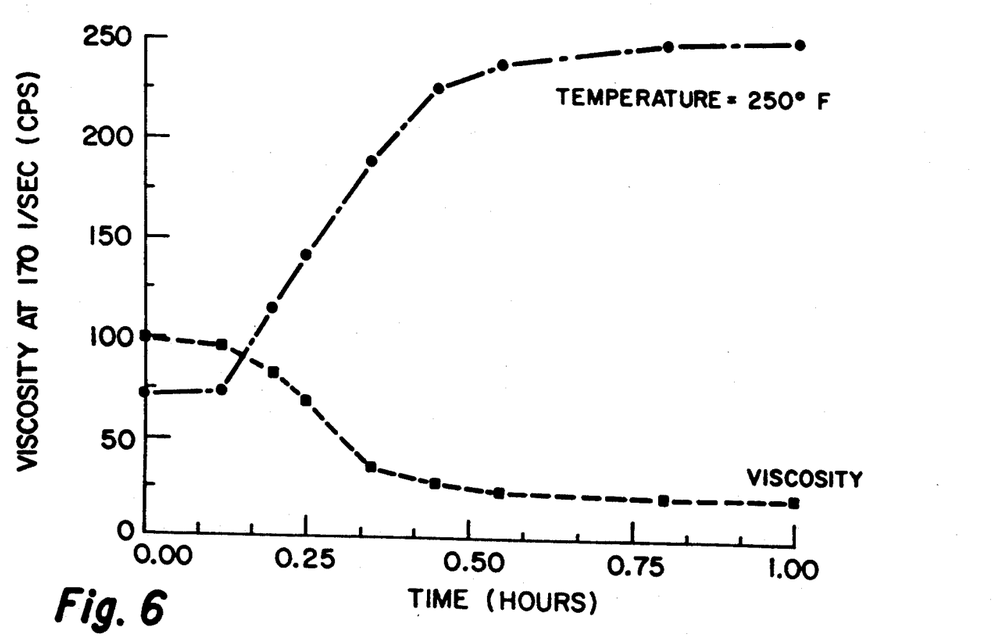
FIG. 6 illustrates the viscosity vs. temperature profile of a gel which is prepared by another method.

A hydrocarbon gel was prepared in accordance with the method of Example 1 except that aluminum octanoate was substituted for the aluminum isopropoxide in the gelling process. The viscosity and temperature vs. time profile for the resulting gel is illustrated in FIG. 6. As will be seen from that Figure, the gel had very low viscosity even at relatively low temperature of less than 100° C. This again demonstrates the effect on a gel that is caused by introducing the aluminum salt to the gel in a chemical form that contains a pH-affecting counter-ion.

Figure 5:
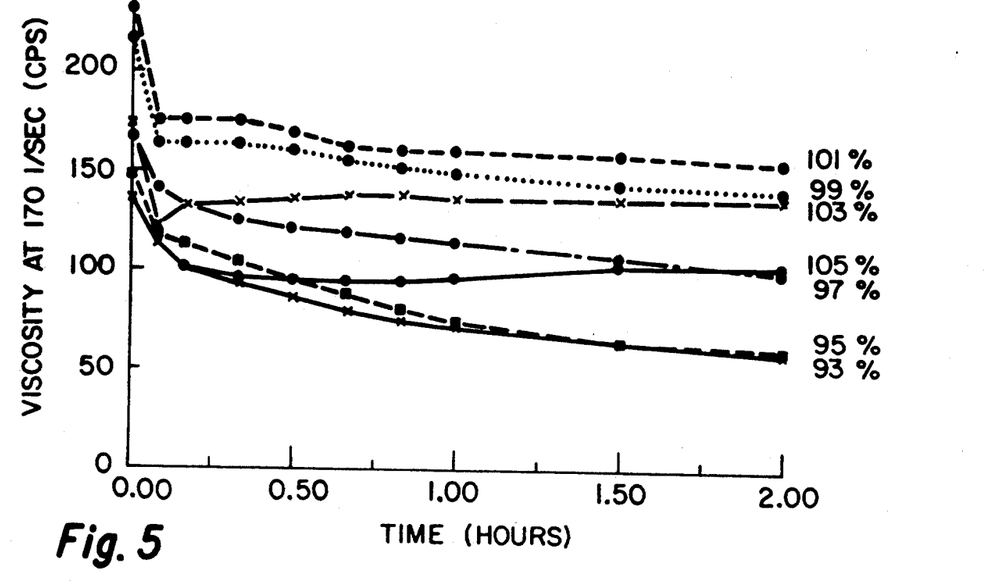
FIG. 5 illustrates the viscosity over time of a gel prepared by the method of the present invention, with different amounts of aluminum isopropoxide salt used as a mole percentage of the theoretical stoichiometric amount.

In preparing a gel by the method of Example 1, it is preferable to use close to 100% of the theoretical stoichiometric amount of aluminum isopropoxide required, for best gel viscosity performance. This fact is illustrated in FIG. 5 wherein gels were prepared by the method of Example 1, but using varying various percentages of aluminum isopropoxide activator.

As mentioned earlier in this discussion, the rheology of a hydrocarbon gel can be altered by the choice of the phosphate diester used to prepare the gel. Changes in the phosphate diester can be effected by varying the ratios of the reactants used in the manufacturing process and/or by varying the reaction temperatures used in the manufacturing process. Several different phosphate diester gelling agents were prepared by the method described in Example 1; wherein (Step 1 of the reaction sequence) various polyphosphate reaction intermediates were formed by altering the mole ratios of $P_2O_5$ to triethyl phosphate or by altering the reaction temperature conditions, and/or wherein (Step 2 of the reaction sequence) various molar amounts of ALFOL 810 were added to the polyphosphate reaction intermediate and/or various reaction temperature conditions were employed. Hydrocarbon gels prepared (also outlined in Example 1) using these various phosphate diester gelling agents were tested on a Fann 50C viscometer to determine their stability at 250° F.

Figure 7:
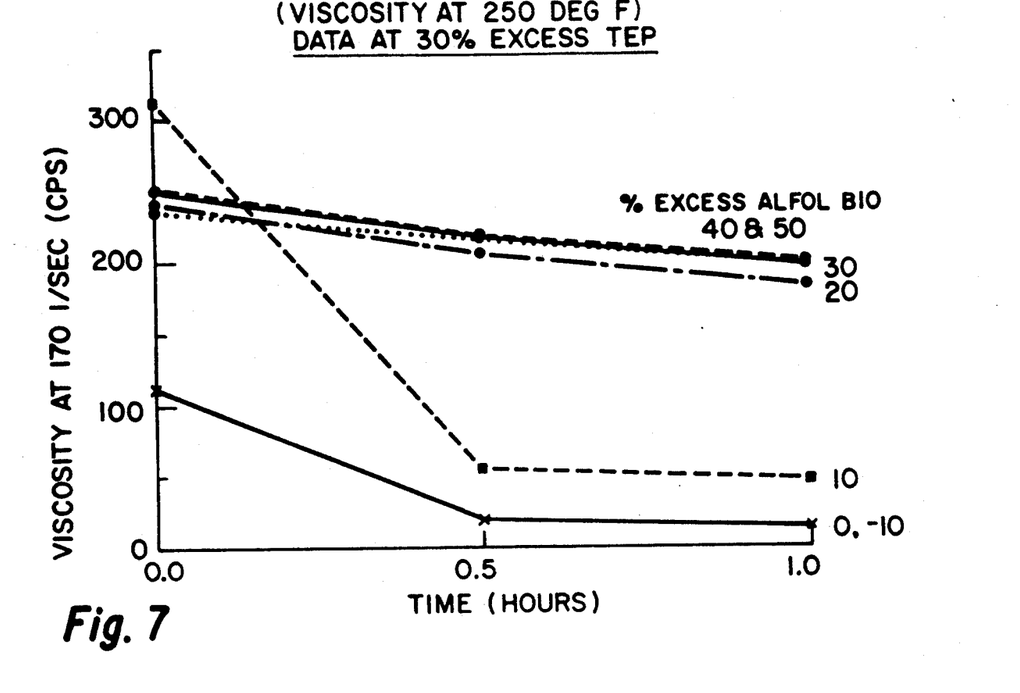
FIGS. 7–15 illustrate viscosity vs. time profiles for gels prepared by the method of the present invention in which the phosphate diesters used to prepare the gels were manufactured under various reaction conditions.

FIG. 7 illustrates the rheology of hydrocarbon gels prepared using gelling agents whose chemistry was varied by changing the molar concentration of ALFOL 810 while maintaining a constant molar concentration of triethyl phosphate. The data from FIG. 7 indicate that gels with the best viscosity vs. time characteristics were obtained when they were prepared with gelling agents that had been manufactured with at least 20% mole excess, and preferably at least 30% mole excess ALFOL 810 in the reaction sequence.

Figure 8:
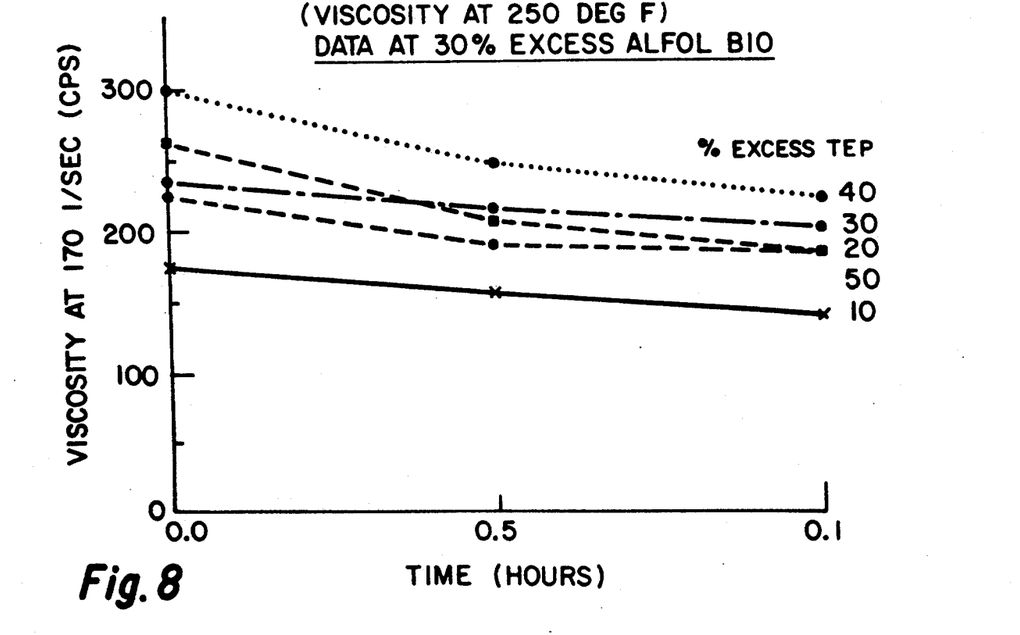

Similarly, FIG. 8 illustrates the rheology of gels prepared using gelling agents whose chemistry was varied by changing the molar concentration of triethyl phosphate while maintaining a constant molar concentration of ALFOL 810. FIG. 8 suggests that gels with the best viscosity profiles were obtained when they were prepared with gelling agents that had been manufactured with 20 to 40% mole excess triethyl phosphate in the reaction sequence.

Combining the information from FIGS. 7 and 8 indicates that a gelling agent prepared with 20 to 40% mole excess triethyl phosphate and 30% mole excess ALFOL 810 can be used to make a hydrocarbon gel that exhibits good viscosity characteristics. In each case, for FIG. 7 and FIG. 8, the reaction temperature for Step 1 of the reaction sequence was held at 70° C. and Step 2 of the reaction sequence was held at 90° C.

Figure 9:
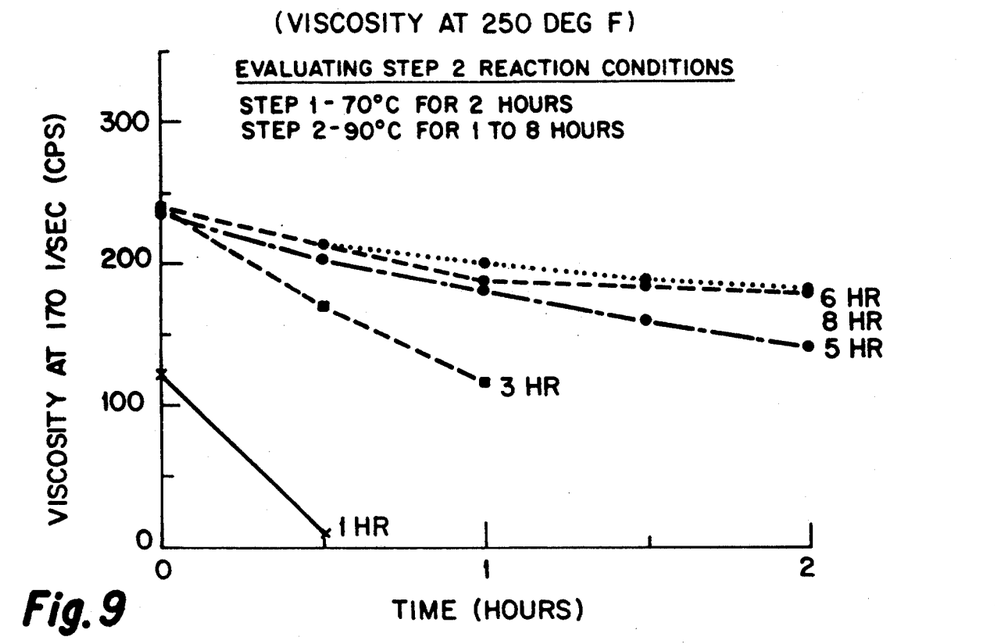
Figure 10:
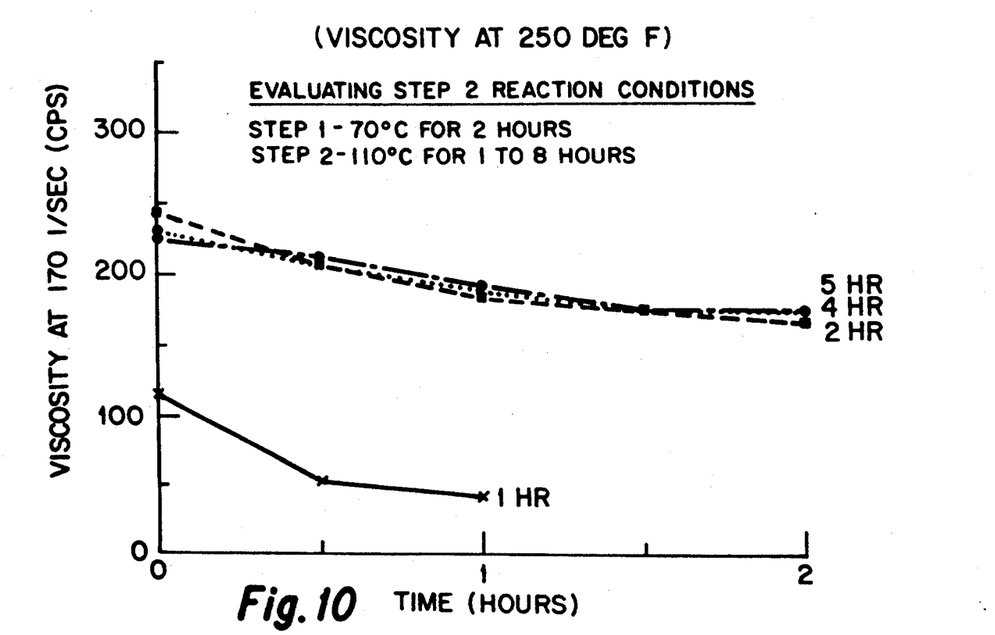
Figure 11:
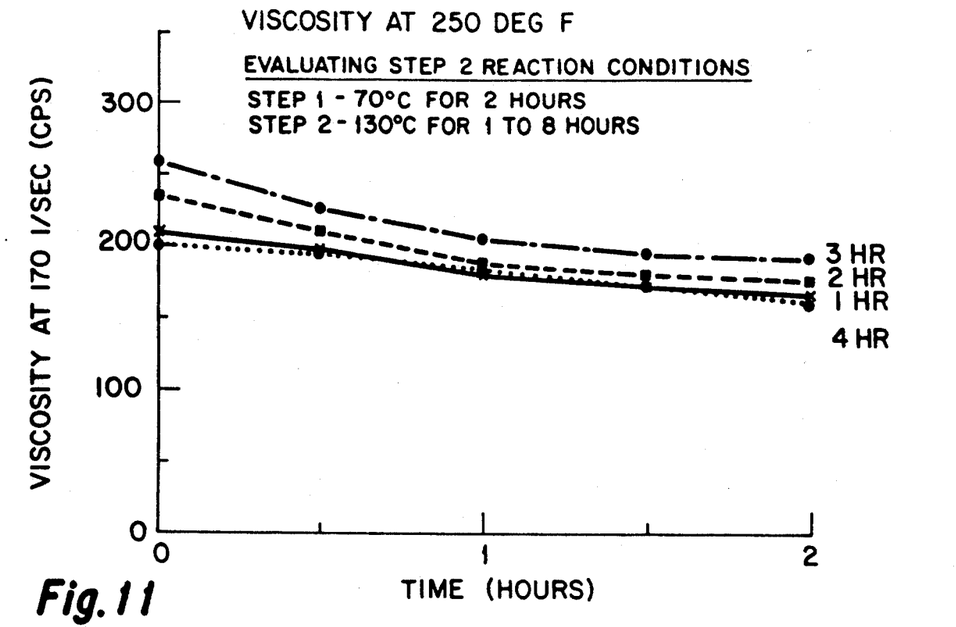

FIGS. 9, 10 and 11 illustrate the viscosity vs. time profiles of hydrocarbon gels prepared (according to Example 1) using gelling agents whose chemistry was varied by changing the duration of and the temperature conditions of Step 2 of the reaction sequence (90° C., 110° C. and 130° C. for FIGS. 9, 10 and 11, respectively) while keeping the temperature of Step 1 at 70° C. Also, the ratios of the reactants were maintained as outlined in Example 1. Each curve on the graphs denotes a change in the duration of the cooking time for Step 2 in the reaction sequence of the phosphate diester gelling agent which was used in the preparation of that respective hydrocarbon gel. The composite evaluation of FIGS. 9, 10 and 11 suggests that the desirable phosphate diester gelling agent can be expediently formed by raising the temperature for Step 2 of the reaction sequence to 130° C.

Figure 12:
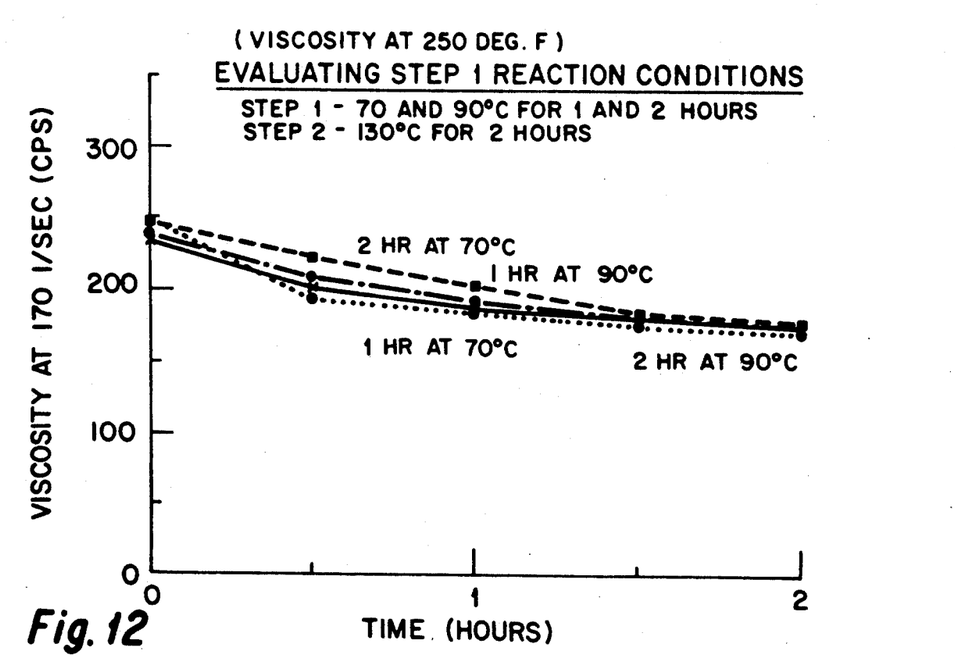

FIG. 12 illustrates the viscosity vs. time profiles of hydrocarbon gels prepared (according to Example 1) using gelling agents whose chemistry was varied by changing the duration of and the temperature conditions (90° C. and 100° C.) of Step 1 of the reaction sequence while keeping the temperature of Step 2 at 130° C. Also the ratios of the reactants were maintained as outlined in Example 1. Each curve on the graph denotes a change in the duration of the cooking time and a change in the cooking temperature for Step 1 in the reaction sequence of the phosphate diester gelling agent that was used in the preparation of that respective gel. The results shown in FIG. 12 indicate that in the preparation of a phosphate diester gelling agent, the variation in temperature between 70° C. and 90° C., and/or the variation in the duration of cooking time from 1 to 2 hours for Step 1 of the reaction sequence impart little difference into the viscosity of a hydrocarbon gel made from the gelling agent.

Figure 13:
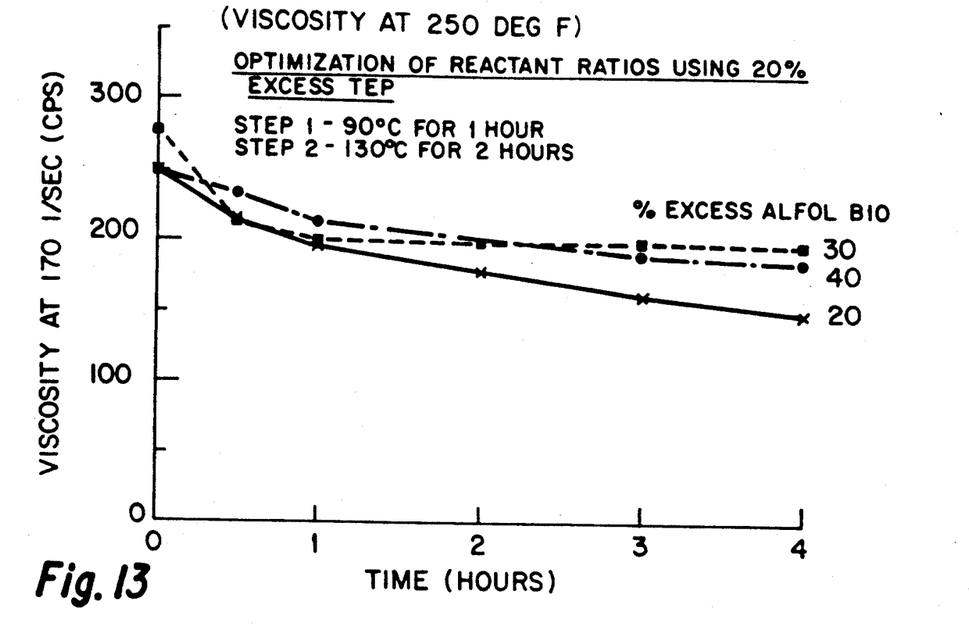
Figure 14:
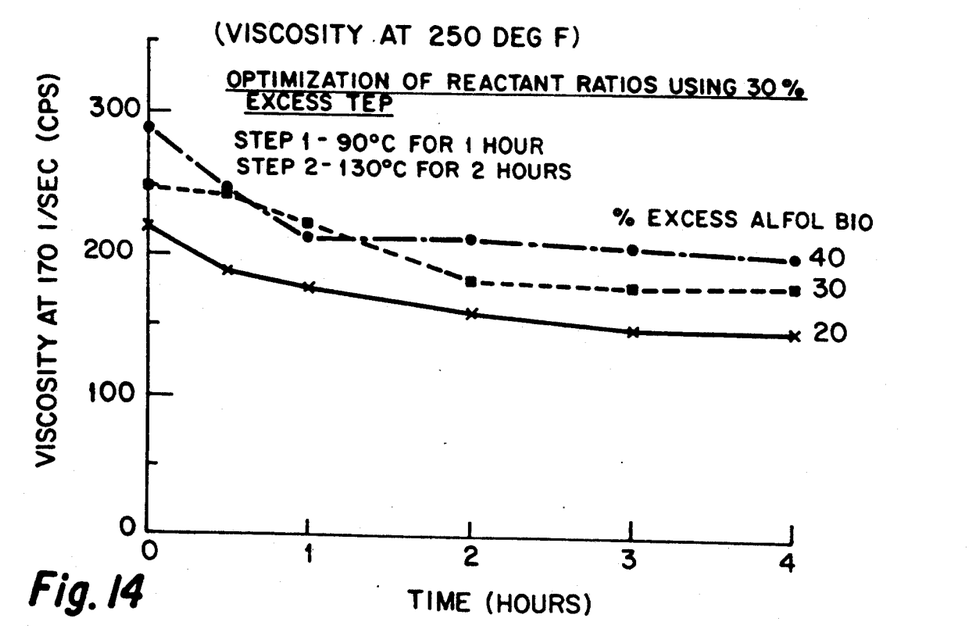
Figure 15:
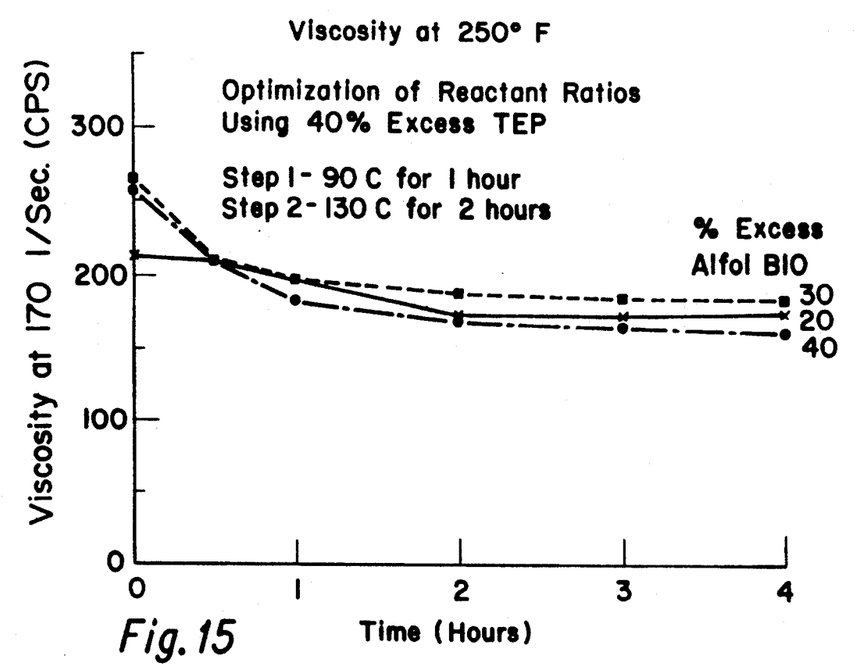

FIGS. 13, 14 and 15 illustrate the viscosity vs. time profiles of hydrocarbon gels prepared (according to Example 1) using gelling agents whose chemistry was varied by changing the ratios of reactants as is indicated in those Figures and at the same time maintaining the optimum temperature conditions as detailed in FIGS. 8-11 (that is, Step 1 of the reaction sequence at 90° C. for one hour, and Step 2 of the reaction sequence at 130° C. for two hours). Each curve on the graphs represents a change in the reactant ratios of the phosphate diester gelling agent which was used in the preparation of that respective gel. The composite evaluation of FIGS. 13, 14 and 15 suggests that the desirable phosphate diester gelling agent can be formed by incorporating 30 to 40 percent mole excess ALFOL 810 (30% and 40% being only slightly better than 20%) and 20 to 40% mole excess triethyl phosphate when carried out at the above prescribed temperature conditions.

Therefore, it will be seen from the results in FIGS. 9-15 that acceptable hydrocarbon gels are made when they are prepared using a phosphate diester gelling agent manufactured according to the following preferred reaction conditions:

Step 1: 90° C. for about one hour with about 20% to about 40% mole-equivalent excess TEP;

Step 2: 130° C. for about two hours with about 30% to about 40% mole-equivalent excess ALFOL 810.

Preferably, about 30% mole excess ALFOL 810 and about 30% mole excess triethyl phosphate are used for making the phosphate diester, based on a cost/performance analysis.

Figure 16:
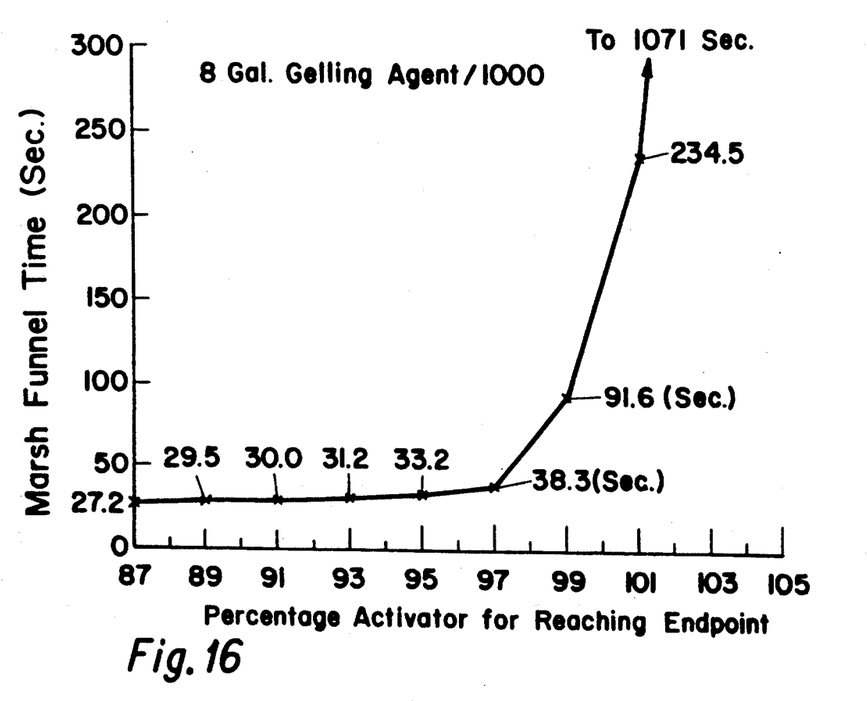
FIG. 16 illustrates the Marsh Funnel time vs. percent aluminum isopropoxide that is needed for reaching the "endpoint" of gel used for fracturing.

FIG. 16 illustrates the Marsh Funnel times of gels as a function of the amount of activator that was used in their preparation. The data in FIG. 16 have been determined for 8 gallons gelling agent per 1000 gallons of diesel oil. The amount of aluminum alkoxide, and in this case aluminum isopropoxide, that is needed for optimizing the gel performance is determined by the usable viscosity of the gel. The "endpoint" of the reaction between the gelling agent and the aluminum activator is said to reach 100% +/−1% when the Marsh Funnel viscosity of the gel falls between 100 and 250 seconds (the time it takes to drain the first 1000 mL from a Marsh Funnel that has been filled with fluid to the screen). In this range, the elevated temperature performance of the gel is good for fracturing purposes, and the viscosity is such that the fluid can still be handled with conventional oilfield equipment. The Marsh Funnel time at the "endpoint" will change as the concentration of gelling agent and activator change and/or can be different for hydrocarbon sources other than diesel oil, however, these can be easily quantified in the lab when necessary.

As will be apparent to those skilled in the art, various modifications can be made in the performance of the method of the present invention. Accordingly, the scope of the present invention is to be interpreted with reference to the following claims.

What is claimed is:

1. A method of preparing a gel, which gel is substantially free of water and pH-affecting substances, and which has a viscosity which is stable at temperatures of at least 250° C., the method comprising:
mixing by contacting a gellable hydrocarbon liquid with an aluminum phosphate diester, prepared by contacting a phosphate diester gelling agent and an aluminum alkoxide activator having a non-pH-affecting residue wherein all reagents are substantially free of water and pH-affecting substances.

2. The method as defined, in claim 1, wherein one radical of each phosphate group of the aluminum phosphate diester is a $C_1$ to $C_{26}$ aliphatic radical, while another radical thereof is a $C_6$ to $C_{26}$ aliphatic radical.

3. The method as described in claim 2, wherein the aliphatic radicals of each phosphate group of the aluminum phosphate diester are alkyl radicals.

4. The method as defined in claim 3, wherein one alkyl radical of each phosphate group of the aluminum phosphate diester is a $C_1$ to $C_3$ alkyl radical, while another radical thereof is a $C_8$ to $C_{18}$ alkyl radical.

5. A method of producing a gel of a hydrocarbon liquid, which gel is substantially free of water and pH-affecting substances, and which has a viscosity which is stable at temperatures of at least 250° F., the method comprising:
mixing by contacting a gellable hydrocarbon liquid with:
(a) phosphate diester gelling agent prepared by
(i) reacting a phosphate triester with $P_2O_5$ so as to produce a corresponding anhydrous polyphosphate;
(ii) reacting the anyhydrous polyphosphate of step (i) with an alcohol so as to produce the corresponding phospahte diester having one radical from the triester and another from the alcohol; and
(b) an aluminum alkoxide as an activator having a non-pH-affecting residue;
wherein all reagents are substantially free of water and pH-affecting substances.

6. The method as described in claim 5, wherein the phosphate triester is a trialkyl ester with all alkyl radicals being $C_2$ to $C_3$ alkyl radicals, and wherein the alcohol is an alkyl alcohol with a $C_8$ to $C_{18}$ alkyl radical.

7. The method as described in claim 6, wherein the aluminum alkoxide is in solution in a non-aqueous solvent.

8. The method as described in claim 6, wherein the phosphate triester is triethyl phosphate, and wherein from about 20 percent to about 40 percent mole excess of the trialkyl phosphate ester is utilized, relative to the amount of $P_2O_5$, in producing the anhydrous polyphosphate.

9. The method as described in claim 8, wherein at least about 20 percent mole excess of the alcohol is utilized in producing the phosphate diester gelling agent.

10. The method as described in claim 7, wherein the phosphate triester is triethyl phosphate, wherein from about 30 percent to 40 percent mole excess of the trialkyl phosphate ester is utilized, relative to the amount of $P_2O_5$, in producing the anhydrous polyphosphate, and wherein at least about 20 percent mole excess of the alcohol is utilized in producing the phosphate diester.

11. The method as described in claim 9, additionally comprising:
maintaining the reaction temperature at least substantially at 130° C. while allowing the anhydrous polyphosphate to react with the alcohol for a period of at least one hour.

12. The method as described in claim 10 additionally comprising:
maintaining the temperature at least substantially at 130° C. while allowing the anhydrous polyphosphate to react with the alcohol for a period of at least one hour.

13. The method as described in claim 10, wherein the alcohol is a $C_8$ to $C_{10}$ alkanol.

14. The method as described in claim 10, wherein the preparation step (a) produces an alcohol salt which is aluminum isopropoxide.

15. A method of fracturing a subterranean rock formation which is penetrated by a wellbore comprising:
(a) preparing a gel, which is substantially free of water and pH-affecting substances, and which is stable at temperature of at least 250° F., by mixing a gellable hydrocarbon liquid with an aluminum phosphate diester prepared by contacting a phosphate diester gelling agent and an aluminum alkoxide activator having a non-pH affecting residue, wherein all reagents are substantially free of water and pH-affecting substances;

(b) entraining a hard particulate proppant within the gel; and (c) pumping the gel down the wellbore into contact with the subterranean formation at sufficient pressure so as to create and/or extend a fracture into the formation.

16. The method as described in claim 15, wherein one radical of each phosphate group of the aluminum phosphate diester is a $C_1$ to $C_{26}$ aliphatic radical, while another radical thereof is a $C_6$ to $C_{26}$ aliphatic radical.

17. The method as described in claim 16, wherein the aliphatic radicals of each phosphate group of the aluminum phosphate diester are alkyl radicals.

18. The method as described in claim 17, wherein one alkyl radical of each aluminum phosphate group of the phosphate diester is a $C_1$ to $C_3$ alkyl radical, while another radical thereof is $C_6$ to $C_{18}$ alkyl radical.

19. The method as described in claim 18, wherein one alkyl radical of each phosphate group of the aluminum phosphate diester is an ethyl radical, while another radical thereof is a $C_8$ to $C_{10}$ alkyl radical.

20. The method as described in claim 18, wherein the gellable hydrocarbon liquid is crude oil.

21. The method as described in claim 18, wherein the gellable hydrocarbon liquid is diesel oil.

22. A method of fracturing a subterranean formation comprising:

(a) preparing a gel, which gel is substantially free of water and pH affecting substances, and which is stable at temperatures of at least 250° F., by mixing by contacting a gellable hydrocarbon liquid with:

(i) a phosphate diester gelling agent prepared by:

(1) reacting a phosphate triester with $P_2O_5$ so as to produce a corresponding anhydrous polyphosphate;

(2) reacting the anhydrous polyphosphate of step (1) with an alcohol so as to produce the corresponding phosphate diester having one radical from the triester and another from the alcohol; and (ii) an aluminum alkoxide as an activator having an non-pH-affecting residue;

wherein all of the reagents are substantially free of water and pH-affecting substances;

(b) entraining a hard particulate proppant within the gel; and (c) pumping the gel down the wellbore into contact with the subterranean formation at sufficient pressure so as to create and/or extend a fracture into the formation.

23. The method as described in claim 22, wherein the aluminum alkoxide is in solution in a non-aqueous solvent, and wherein one radical of each phosphate group of the phosphate diester is a $C_1$ to $C_3$ alkyl radical, while another radical thereof is a $C_6$ to $C_{18}$ alkyl radical.

24. The method as described in claim 23, wherein the gellable hydrocarbon liquid is diesel oil.

25. The method as described in claim 23, wherein the gellable hydrocarbon liquid is crude oil.

26. A method of preparing a gel of a hydrocarbon liquid, which gel is substantially free of water and pH-affecting substances, and which has a viscosity which is stable at temperatures of at least 250° F., the method comprising:

admixing together a hydrocarbon liquid which is gellable, a gelling agent which comprises a phosphate diester, and an activator for the gelling agent which has a non-pH-affecting residue and comprises an aluminum alkoxide.

27. The method according to claim 26, wherein the activator is in solution in a non-aqueous solvent when admixed.

* * * * *